(12) United States Patent
Stevens et al.

(10) Patent No.: US 8,659,396 B2
(45) Date of Patent: Feb. 25, 2014

(54) METHOD AND APPARATUS FOR DYNAMICALLY-TUNED COMMUNICATION WITH ONE AMONG MYRIAD TAGS

(75) Inventors: John K. Stevens, Stratham, NH (US); Paul Waterhouse, Selkirk (CA); Florin Tarcoci, Glen Walter (CA)

(73) Assignee: Visible Assets, Inc., Mississauga, Ontario (CA)

( * ) Notice: Subject to any disclaimer, the term of this patent is extended or adjusted under 35 U.S.C. 154(b) by 1646 days.

(21) Appl. No.: 11/462,981

(22) Filed: Aug. 7, 2006

(65) Prior Publication Data

US 2007/0120649 A1 May 31, 2007

Related U.S. Application Data

(63) Continuation of application No. 11/459,647, filed on Jul. 25, 2006, now abandoned.

(60) Provisional application No. 60/596,684, filed on Oct. 12, 2005, provisional application No. 60/806,520, filed on Jul. 3, 2006, provisional application No. 60/720,074, filed on Sep. 23, 2005.

(51) Int. Cl.
*G08B 13/184* (2006.01)

(52) U.S. Cl.
USPC .............. 340/10.2; 340/10.1; 340/572.1

(58) Field of Classification Search
USPC ............. 340/10.1, 10.2, 10.3, 10.33, 10.34, 340/572.1
See application file for complete search history.

(56) References Cited

U.S. PATENT DOCUMENTS

| | | | | |
|---|---|---|---|---|
| 4,821,291 | A * | 4/1989 | Stevens et al. | 375/259 |
| 5,300,875 | A * | 4/1994 | Tuttle | 320/138 |
| 5,491,715 | A * | 2/1996 | Flaxl | 375/344 |
| 5,532,686 | A * | 7/1996 | Urbas et al. | 340/10.51 |
| 6,070,803 | A * | 6/2000 | Stobbe | 235/492 |
| 6,317,027 | B1 * | 11/2001 | Watkins | 340/10.1 |
| 6,525,649 | B1 * | 2/2003 | Ueda et al. | 340/10.34 |

* cited by examiner

*Primary Examiner* — Edwin Holloway, III
(74) *Attorney, Agent, or Firm* — Larson & Anderson, LLC

(57) ABSTRACT

An area-reading antenna (in RF linkage with myriad RF tags) is dynamically tuned. It may be dynamically tuned as to its transmission of a power/clock field, or dynamically tuned as to its transmission of a data signal, or dynamically tuned as to its reception of a data signal, or some combination of all three. In this way, a base station has an improved ability to communicate with a greater fraction of the RF tags within its reading area, despite detuning of individual tags due to proximity of detuning influences such as metal or liquids.

12 Claims, 6 Drawing Sheets

METHOD AND APPARATUS FOR DYNAMICALLY-TUNED COMMUNICATION WITH ONE AMONG MYRIAD TAGS

CROSS-REFERENCE TO RELATED APPLICATIONS

This application claims priority from U.S. application Ser. No. 11/459,647 filed Jul. 25, 2006 (now abandoned), which claims priority from U.S. application No. 60/806,520 filed Jul. 3, 2006, which applications are incorporated herein by reference for all purposes. This application claims priority from U.S. application No. 60/596,684 filed Oct. 12, 2005, which application is hereby incorporated herein by reference for all purposes.

The invention relates generally to radio communications and relates more particularly to communications between a host (base station) and myriad passive or active radio tags.

BACKGROUND

It is not easy to create a system that permits a base station to communicate individually with each of myriad radio tags in an area, particularly where the tags are required to be limited in cost and size and are required to function for a long time without a problem of a battery running down. Consider the particular case where the reading of the tags is intended to be an "area read", meaning that the tags are distributed about an area and the base station is at some distance from many of the tags and the operator of the system does not have the luxury of being able to assume that a reader is moved to each of the tags seriatim for individual close-up reading.

Nearly all RF-ID tag systems in the prior art are systems that designed on the assumption that when a reader reads a tag, the reader and tag are close together or (in some systems) the reader has a high-gain antenna pointed directly at the tag and at no other tag. In this way, the tag is bathed in RF energy and responds specifically because it notices that it has been bathed in RF energy.

With such tags it is impossible to do an "area read". Stated differently, if some antenna were positioned so as to be RF-linked with myriad tags, then bathing several or most of the tags in RF energy would simply yield an unintelligible burst of radio clutter. With such a system, the reader would receive confused and overlapping responses if the reader were juxtaposed or positioned so that more than one tag is in its reading path.

One design decision that can help with making "area reads" possible is the use of lower radio frequencies rather than higher frequencies. This is not easy to do but approaches such as those described in U.S. application Ser. No. 11/276,096 filed Feb. 14, 2006, incorporated herein by reference, can make it possible to use lower frequencies.

Another design decision that can help with making "area reads" possible is the use of tags that do not simply respond each time they are bathed in RF energy, but that instead respond only after certain conditions are satisfied, such as receipt of a message with particular content or development of a predefined internal state. Such tags are described in U.S. application Ser. No. 11/419,750 filed May 22, 2006, incorporated herein by reference. With such a system there may be a power/clock RF field that provides power and clock information to the myriad tags in the reading area, and then a different data RF field (typically at a higher frequency than the power/clock field) permits messages to be passed to the tags and permits tags to respond. Each tag typically has two distinct antennas, one for for receiving the power/clock and another for sending and receiving data messages. The base station may likewise have two distinct antennas, or may employ a single antenna directed to both purposes.

But even with these design decisions, a system designer cannot do as much as one would like to do in terms of area reads over substantial areas and in terms of large numbers of tags that are in varied orientations relative to the base station and that may have been "detuned" due to proximity to metal or liquids or other materials that distort electrical or magnetic fields. One would like to be able to pick up a particular tag to the exclusion of others. One would like to be able to pick up all or nearly all of the tags in an area, rather than only being able to pick up some of them.

It would thus be very desirable if additional design elements could be devised that would help to facilitate these aspects of performing "area reads".

SUMMARY OF THE INVENTION

An area-reading antenna (in RF linkage with myriad RF tags) is dynamically tuned. It may be dynamically tuned as to its transmission of a power/clock field, or dynamically tuned as to its transmission of a data signal, or dynamically tuned as to its reception of a data signal, or some combination of all three. In this way, a base station has an improved ability to communicate with a greater fraction of the RF tags within its reading area, despite detuning of individual tags due to proximity of detuning influences such as metal or liquids.

DESCRIPTION OF THE DRAWING

The invention will be described with respect to a drawing in several figures.

DETAILED DESCRIPTION

Figure 1:
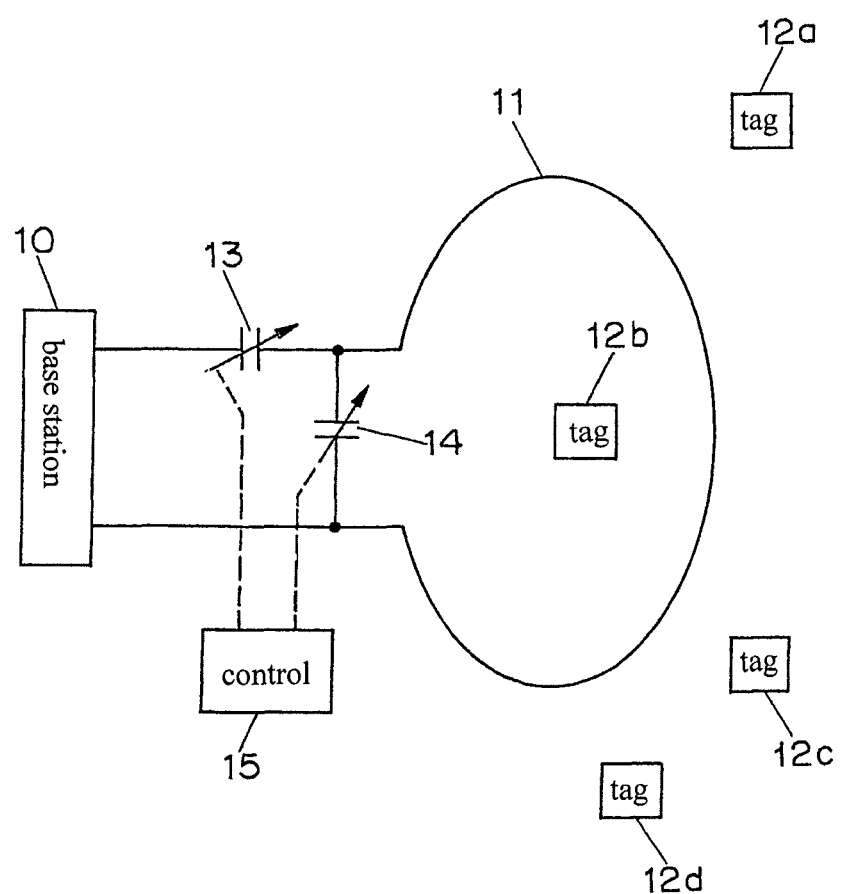
FIG. 1 shows a dynamically tuned base station antenna and a plurality of RF tags.

FIG. 1 shows a base station 10 having an antenna 11 and a plurality of RF tags 12*a*, 12*b*, 12*c*, 12*d*.

It should be appreciated that the RF design environment of a system such as that shown in FIG. 1 is extremely different from most RF design environments. In many design environments the designer has the luxury of being able to assume that the antenna is manufactured specifically for a particular purpose and is impedance-matched to the transceiver. No such luxury is available to the designer of an area-read system, where the antenna is often best thought of as basically a random wire that happens to cover the area to be read.

In many design environments the designer is able to assume that the devices being communicated with are stationary. No such luxury is available to the designer of such an area-read system.

In many design environments the designer is able to assume that the devices being communicated with have plenty of power (e.g. cell phones with rechargeable batteries). No such luxury is available to the designer of such an area-read system.

In some design environments the designer is able to assume that the base station (and/or its antenna) is moved from place to place, being in close proximity with only one device at a time. No such luxury is available to the designer of such an area-read system.

In some design environments the designer is able to assume that the base station antenna is a high-gain antenna, pointing to only one device at a time (for example a highway toll collection system with a directional antenna pointed directly at a single lane of traffic). No such luxury is available to the designer of such an area-read system.

In accordance with the invention, an antenna tuning system is provided. In this exemplary embodiment variable capacitors 13, 14 are provided in series with and in parallel with the antenna 11, and are controlled by a control means 15. The control means 15 acts to match the antenna 11 to the radio transmitter and receiver of the base station 10.

At first glance one might think of the system of FIG. 1 as simply an antenna tuner of a traditional sort, such as the type of antenna tuner used by an amateur radio operator to couple a transceiver to a "random-wire" antenna. Such antenna tuners are well known. With such an antenna tuner, the tuner is adjusted once to provide an impedance match (thus optimizing the SWR or standing-wave ratio), and then the setting remains the same for as long a the transceiver is being used at a particular frequency. Only when the operator shifts to a different frequency or a different frequency band (e.g. from 40 meters to 160 meters) would the tuner be adjusted away from its previous settings. But as will be appreciated in the discussion which follows, the invention calls for quite different activities.

Figure 2:
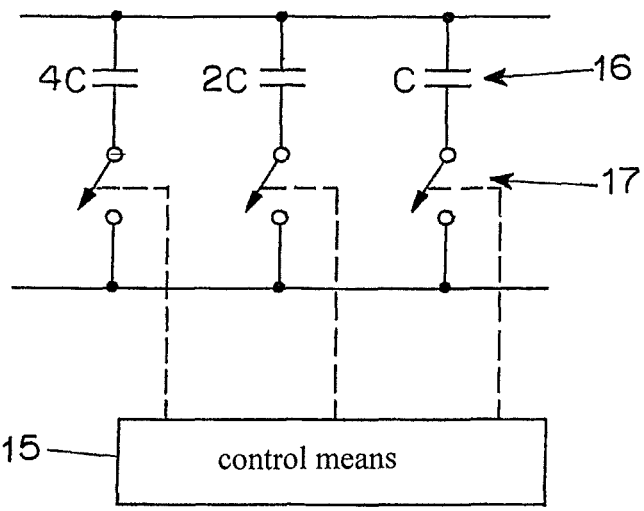
FIG. 2 shows one type of capacitor ladder which can be used as part of a tuning system for an antenna.

FIG. 2 shows one type of capacitor ladder which can be used as part of a tuning system for an antenna. The capacitor ladder has a series of capacitors 16, each twice as large (in capacitance) as the next. Switches 17 determine which capacitors are in-circuit and which are not, thus permitting control means 15 to select a particular capacitance value at a particular time, and to change the value from time to time. Another approach is to use a variable capacitor (e.g. with moving blades in greater or lesser engagement) controlled by a servo motor. Those skilled in the art can readily review the substantial prior art in the area of antenna tuners and can pick and choose from among that prior art to achieve antenna tuning as needed here, all without departing from the invention. It is not, for example, required that two capacitors 13, 14 be used, as other reactive elements (and other combinations of reactive elements) can be employed to achieve desired matching and tuning.

Figure 3:
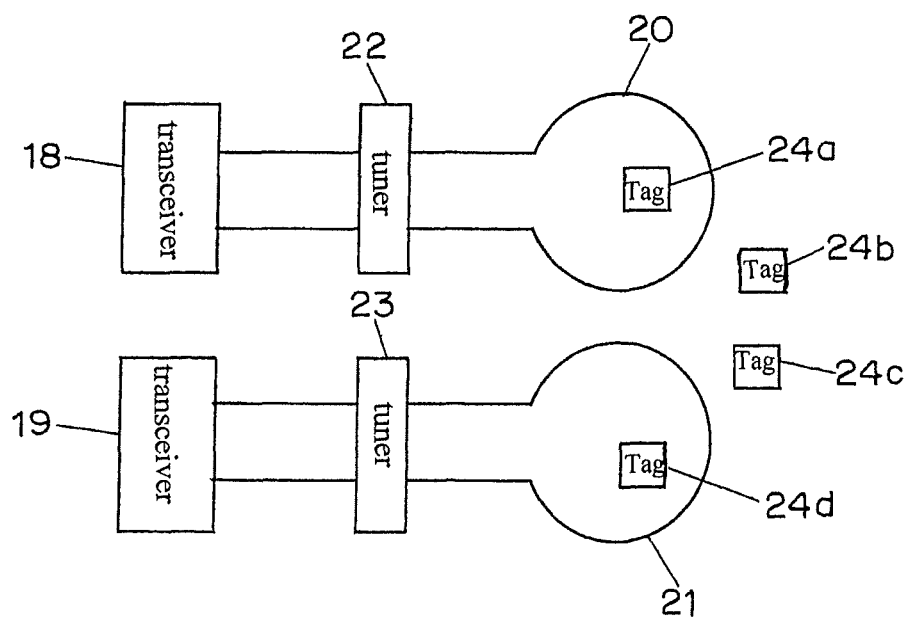
FIG. 3 shows a base station with separate antennas for power/clock and data, each dynamically tuned, and in RF linkage with a plurality of RF tags.

FIG. 3 shows a base station 18, 19 with separate antennas 20, 21 for power/clock and data, each dynamically tuned, and in RF linkage with a plurality of RF tags 24a, 24b, 24c, and 24d. In such a system there are matchers/tuners 22, 23, each matching a respective antenna 20, 21 with its respective transmitter or receiver or transceiver 18, 19.

As described in the above-mentioned U.S. application No. 60/596,684 filed Oct. 12, 2005, the tags 24a, 24b, 24c, and 24d may be tags each of which has two antennas, and each of which lacks any other power source, one antenna receiving power/clock and the other antenna receiving and transmitting data. For the base station to communicate with such tags, it must actuate each of the antennas 20, 21 from time to time. On the other hand, as described in the above-mentioned U.S. application No. 60/596,684 filed Oct. 12, 2005, one or more of the tags 24a, 24b, 24c, and 24d may be a tag having a battery and not necessarily requiring external power. Thus one or more of the tags may be independently powered, for example by a battery.

Figure 6:
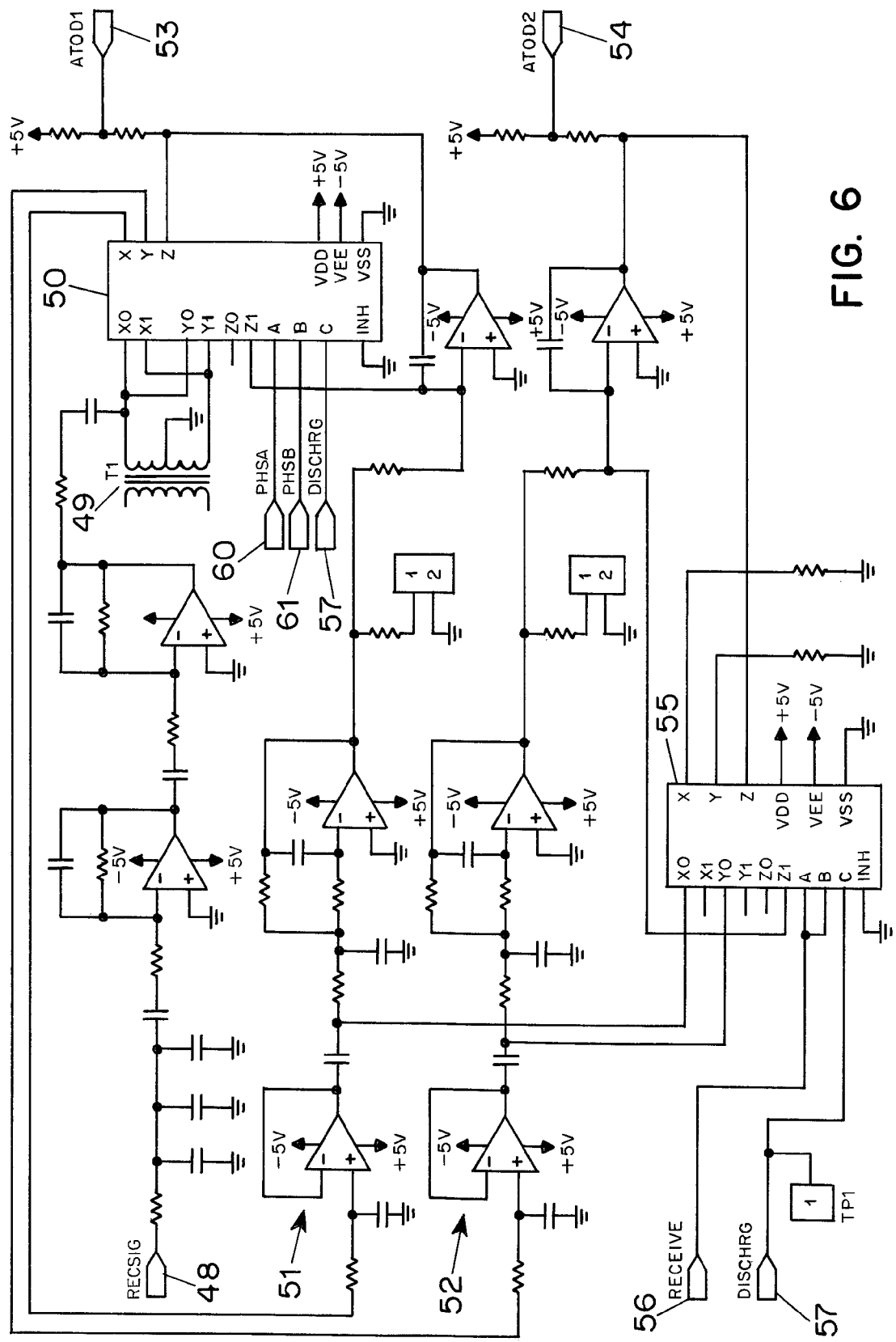
FIG. 6 shows a receiver for a base station according to the invention.
Figure 7:
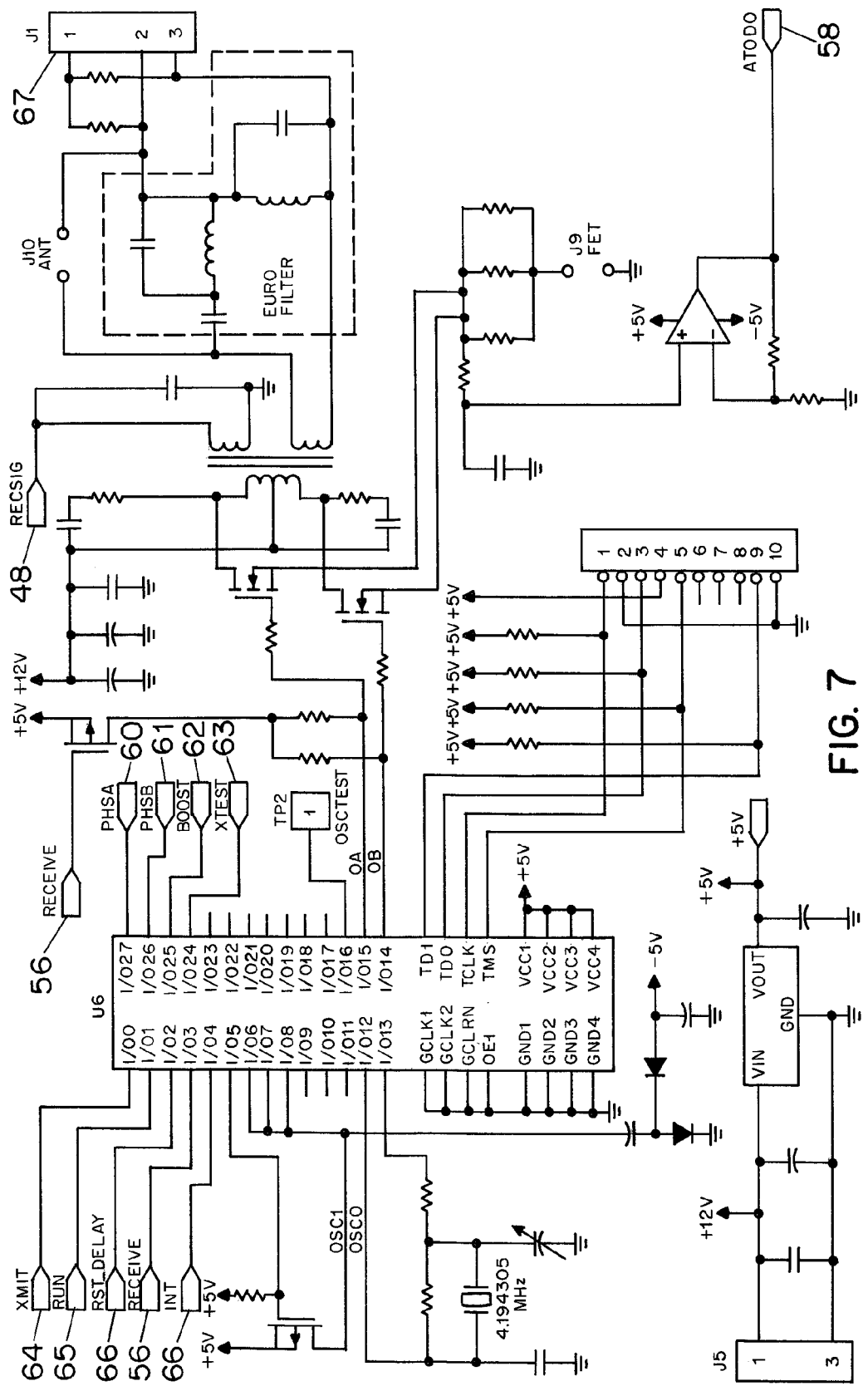
FIG. 7 shows a transmitter for a base station according to the invention.

An exemplary base station according to the invention is shown in several parts—a microcontroller (FIG. 4), an antenna tuner (FIG. 5), a receiver (FIG. 6), and a transmitter (FIG. 7). The function of the base station will now be discussed in some detail.

External connectors. In this exemplary embodiment there are several external connectors. These are:
RS232 connector 31 (FIG. 4)
programming port J6 (FIG. 4)
power connector J5 (FIG. 7)
antenna connector 20 (FIG. 5)

Figure 4:
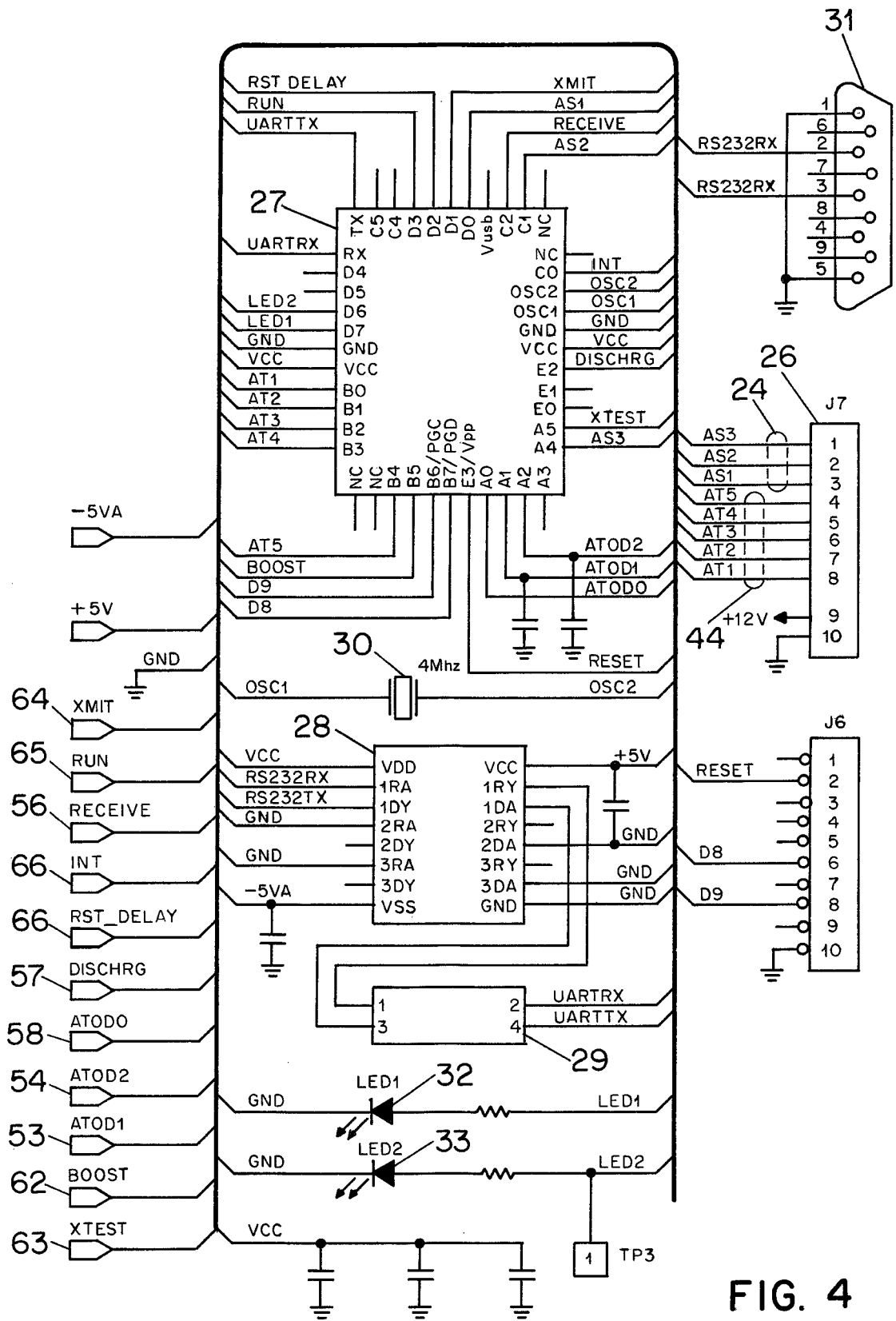
FIG. 4 shows a microcontroller for a base station according to the invention.
Figure 5:
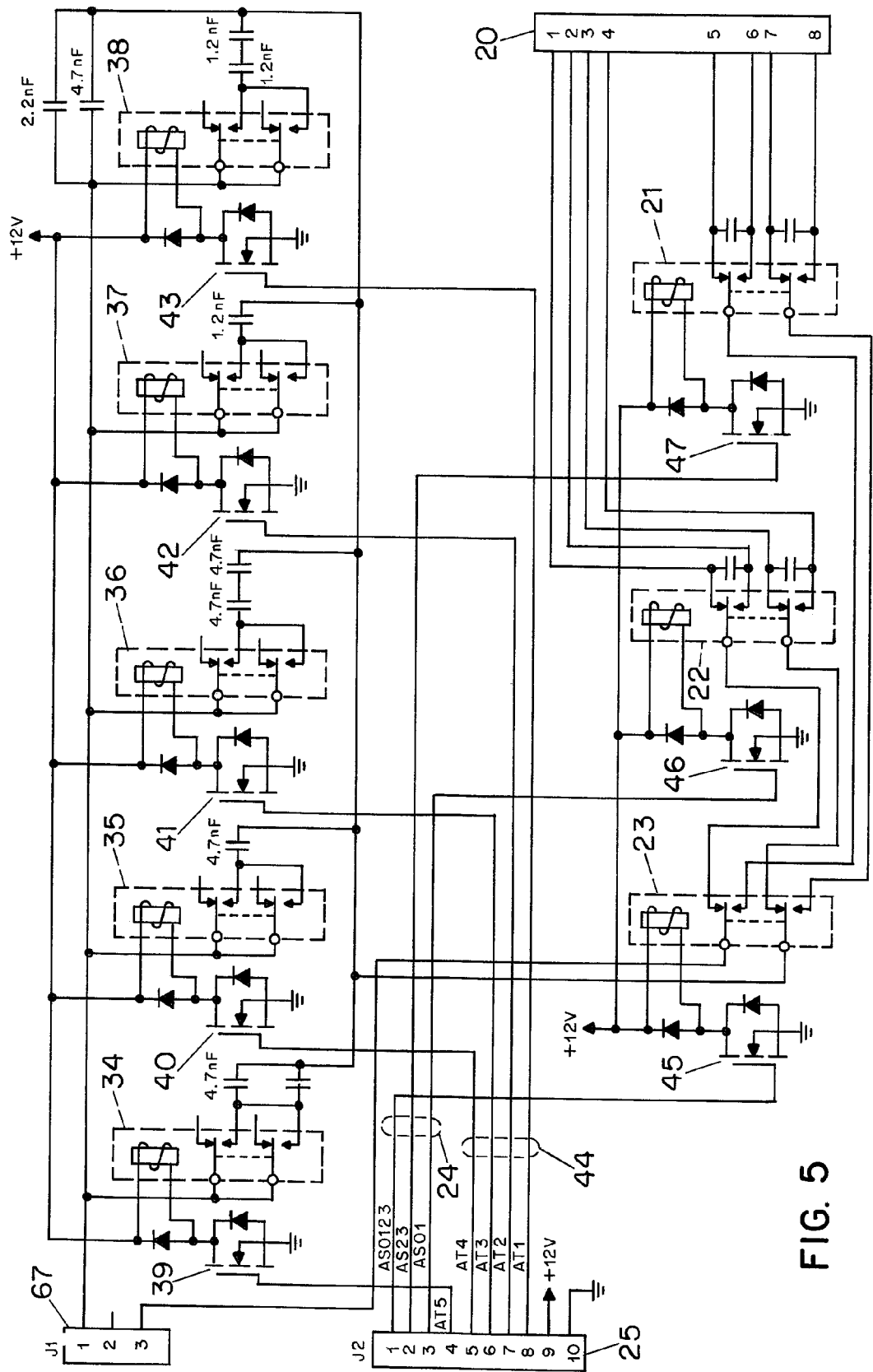
FIG. 5 shows an antenna tuner for a base station according to the invention.

In an exemplary embodiment one circuit board carries the circuitry for FIGS. 4, 6, and 7, and a separate circuit board carries the circuitry for FIG. 5. Transmitter circuitry FIG. 7 includes a Complex Programmable Logic Device (CPLD) U6. Microcontroller circuitry FIG. 4 includes a microcontroller 27.

Receive Data Path.

A received RF signal is received on a loop antenna, omitted for clarity in FIG. 5, but attached to a pair of terminals at connector 20. Relays 21, 22, and 23 are controlled by transistors 47, 46, and 45 respectively, and comprise a four-to-one multiplexer which connects one of four possible antennas to the rest of the circuitry. Selector lines 24 control the multiplexer, and pass through connector 25 to FIG. 4, where they are selected by microcontroller 27.

The received signal is matched (tuned) by capacitors selected by relays 34, 35, 36, 37, 38. These capacitors are connected, or are not connected, in parallel, so as to provide an optimal standing-wave ratio between the antenna and the transmitter (FIG. 7) and receiver (FIG. 6). The relays are controlled by control lines 44 which pass through connector 25 to FIG. 4, where they are selected by microcontroller 27. In this way, any of thirty-two different capacitance values may be selected for antenna-matching purposes. The received RF signal passes through connector 67 to FIG. 7.

In FIG. 7, the received signal at connector 67 is coupled to signal line 48, called "recsig". This signal line passes to signal line 48 in FIG. 6 which is the radio receiver. The received signal is filtered and reaches transformer 49 which develops two phases of the received signal, 180 degrees out of phase with each other. Multiplexers 50 and 55 are each a triple two-channel multiplexer, or the equivalent of three single-pole-double throw switches. Control line 60 determines which of the two phases is provided to analog path 51. Control line 61 determines which of the two phases is provided to analog path 52.

A first integrator receiving the analog path 51 and feeds output line 53. A second integrator receives the analog patch 52 and feeds output line 54. Discharge line 57 determines whether the capacitors of the integrators are discharged (reset). Output lines 53, 54 pass to FIG. 4 and thence to microcontroller 27. Microcontroller 27 optionally provides the received signal as a TTL signal to jumpers 29 and thence to RS232 level shifter 28, and thence to RS232 connector 31 to external equipment omitted for clarity in FIGS. 4, 5, 6, and 7.

Transmit Data Path.

External equipment, omitted for clarity in FIGS. 4, 5, 6, and 7, may pass a serial data signal through connector 31 (FIG. 4 to RS232 level shifter 28 and thence to microcontroller 27. Microcontroller 27 sends a transmit signal on line 64 to FIG. 7, where IC U6 develops quadrature A and quadrature B signals QA and QB. These signals drive a transformer which is in turn coupled with connector 67. RF signal at connector 67 passes to FIG. 5, where it is coupled with the above-mentioned antenna tuner capacitors and then to one or another of four possible antennas at connector 20.

In use, the base station described here can interact with myriad RF tags, carrying out a method such as the following:

transmitting a power/clock field from the antenna at a first frequency below 1 MHz, thereby providing power and clock to a plurality of the RF tags;

while the power/clock field is being transmitted, first transmitting a data signal from the antenna at a second frequency, the second frequency higher than the first frequency and below 1 MHz, and receiving a response from at least a first one of the RF tags at the antenna while not receiving a response from at least a second one of the RF tags;

tuning the antenna differently than during the first transmitting;

while the power/clock field is being transmitted, for a second time transmitting a data signal from the antenna at the second frequency, and receiving a response from the at least a second one of the RF tags at the antenna.

The first and second frequencies may both be below 450 kHz.

The tuning of the antenna yielding the response from the at least a second one of the RF tags may be based upon stored information regarding tuning that previously yielded a response from the at least a second one of the RF tags.

The method may be such that the first transmitting also does not receive a response from at least a third one of the RF tags, and may be such that the second transmitting also does not receive a response from the at least a third one of the RF tags, in which case the following may be carried out:

tuning the antenna differently than during the first transmitting and differently than during the second transmitting;

while the power/clock field is being transmitted, for a third time transmitting a data signal from the antenna at the second frequency, and receiving a response from the at least a third one of the RF tags at the antenna.

Yet another method that may be carried out is:

transmitting a power/clock field from the first antenna at a first frequency below 1 MHz, thereby providing power and clock to a plurality of the RF tags;

while the power/clock field is being transmitted, first transmitting a data signal from the second antenna at a second frequency, the second frequency higher than the first frequency and below 1 MHz, and receiving a response from at least a first one of the RF tags at the second antenna while not receiving a response from at least a second one of the RF tags;

tuning the second antenna differently than during the first transmitting;

while the power/clock field is being transmitted, for a second time transmitting a data signal from the second antenna at the second frequency, and receiving a response from the at least a second one of the RF tags at the second antenna.

The base station described here can interact with myriad self-powered RF tags, carrying out a method such as the following:

first transmitting a data signal from the antenna at a frequency, the frequency below 1 MHz, and receiving a response from at least a first one of the RF tags at the antenna while not receiving a response from at least a second one of the RF tags;

tuning the antenna differently than during the first transmitting;

thereafter, for a second time transmitting a data signal from the antenna at the frequency, and receiving a response from the at least a second one of the RF tags at the antenna.

It will be appreciated that this base station is able to carry out its activities in a way that is optimized for a particular tag, despite its possible detuning due to nearby metal objects or other interfering conditions, based for example upon a stored record of the circumstances that permitted successful communication with that particular tag in the past.

The base station is able to select among several antennas, each of which may be oriented differently in three-dimensional space, and one of which may couple more effectively with a particular RF tag than the others of the antennas.

The base station is able to carry out impedence matching (by means of the antenna tuner of FIG. 5) to couple effectively between a particular antenna and the radio transmitter and receiver (FIGS. 6 and 7). In particular, antennas can be "random wire" and can nonetheless be tuned effectively to the radio transmitter and receiver.

The base station is able to shift its transmit and receive frequencies dynamically, so as to pick up RF tags that have been detuned as mentioned above.

Those skilled in the art will have no difficulty devising countless obvious variations and improvements upon the invention as described here in connection with a particular embodiment, which variations and improvements are intended to be encompassed within the claims which follow.

The invention claimed is:

1. A method for use with a base station comprising a tunable area-reading antenna and myriad RF tags nearby, the method comprising the steps of:

transmitting a power/clock field from the antenna at a first frequency below 1 MHz, thereby providing power and clock to a plurality of the RF tags;

while the power/clock field is being transmitted, first transmitting a data signal from the antenna at a second frequency, the second frequency higher than the first frequency and below 1 MHz, and receiving a response from at least a first one of the RF tags at the antenna while not receiving a response from at least a second one of the RF tags;

impedance tuning the antenna differently than during the first transmitting;

while the power/clock field is being transmitted, for a second time transmitting a data signal from the antenna at the second frequency, and receiving a response from the at least a second one of the RF tags at the antenna.

2. The method of claim 1 further characterized in that the first and second frequencies are both below 450 kHz.

3. The method of claim 1 where the tuning of the antenna yielding the response from the at least a second one of the RF tags is based upon stored information regarding tuning that previously yielded a response from the at least a second one of the RF tags.

4. The method of claim 1 wherein the first transmitting also does not receive a response from at least a third one of the RF tags, and wherein the second transmitting also does not receive a response from the at least a third one of the RF tags, the method further comprising the steps of; tuning the antenna differently than during the first transmitting and differently than during the second transmitting; while the power/clock field is being transmitted, for a third time transmitting a data signal from the antenna at the second frequency, and receiving a response from the at least a third one of the RF tags at the antenna.

5. A method for use with a base station comprising first and second tunable antennas and myriad RF tags nearby, the method comprising the steps of: transmitting a power/clock field from the first antenna at a first frequency below 1 MHz, thereby providing power and clock to a plurality of the RF tags; while the power/clock field is being transmitted, first transmitting a data signal from the second antenna at a second frequency, the second frequency higher than the first frequency and below 1 MHz, and receiving a response from at least a first one of the RF tags at the second antenna while not receiving a response from at least a second one of the RF tags; tuning the second antenna differently than during the first transmitting; while the power/clock field is being transmitted, for a second time transmitting a data signal from the second antenna at the second frequency, and receiving a response from the at least a second one of the RF tags at the second antenna.

6. The method of claim 5 further characterized in that the first and second frequencies are both below 450 kHz.

7. The method of claim 5 where the tuning of the antenna yielding the response from the at least a second one of the RF tags is based upon stored information regarding tuning that previously yielded a response from the at least a second one of the RF tags.

8. The method of claim 5 wherein the first transmitting also does not receive a response from at least a third one of the RF tags, and wherein the second transmitting also does not receive a response from the at least a third one of the RF tags, the method further comprising the steps of; tuning the second antenna differently than during the first transmitting and differently than during the second transmitting; while the power/clock field is being transmitted, for a third time transmitting a data signal from the second antenna at the second frequency, and receiving a response from the at least a third one of the RF tags at the second antenna.

9. A method for use with a base station comprising a tunable area-reading antenna and myriad independently powered RF tags nearby, the method comprising the steps of:

first transmitting a data signal from the antenna at a first frequency, the first frequency below 1 MHz, and receiving a response from at least a first one of the independently powered RF tags at the antenna while not receiving a response from at least a second one of the independently powered RF tags;

impedance tuning the antenna differently than during the first transmitting;

for a second time transmitting a data signal from the antenna at the first frequency, and receiving a response from the at least a second one of the independently powered RF tags at the antenna.

10. The method of claim 9 further characterized in that the first frequency is below 450 kHz.

11. The method of claim 9 where the impedance tuning of the antenna yielding the response from the at least a second one of the independently powered RF tags is based upon stored information regarding impedance tuning that previously yielded a response from the at least a second one of the independently powered RF tags.

12. The method of claim 9 wherein the first transmitting also does not receive a response from at least a third one of the independently powered RF tags, and wherein the second transmitting also does not receive a response from the at least a third one of the independently powered RF tags, the method further comprising the steps of; impedance tuning the antenna differently than during the first transmitting and differently than during the second transmitting; for a third time transmitting a data signal from the antenna at the first frequency, and receiving a response from the at least a third one of the independently powered RF tags at the antenna.

* * * * *